United States Patent [19]

Murai et al.

[11] Patent Number: 5,664,031
[45] Date of Patent: Sep. 2, 1997

[54] IMAGE PROCESSING APPARATUS WITH FUNCTION OF EXTRACTING VISUAL INFORMATION FROM REGION PRINTED IN DROPOUT COLOR ON SHEET

[75] Inventors: Yukako Murai; Tamio Amagai, both of Kawasaki, Japan

[73] Assignee: Fujitsu Limited, Kawasaki, Japan

[21] Appl. No.: 545,373

[22] Filed: Oct. 19, 1995

Related U.S. Application Data

[63] Continuation of Ser. No. 136,463, Oct. 15, 1993, abandoned.

[30] Foreign Application Priority Data

Nov. 15, 1992 [JP] Japan .................. 4-277343

[51] Int. Cl.⁶ .................. G06K 9/20
[52] U.S. Cl. .................. 382/317
[58] Field of Search .................. 382/173, 191, 382/317, 282, 321; 348/273, 225, 289, 612, 616; 358/453, 464, 517

[56] References Cited

U.S. PATENT DOCUMENTS

| | | | |
|---|---|---|---|
| 4,538,182 | 8/1985 | Saito et al. | 358/280 |
| 4,933,984 | 6/1990 | Nakano et al. | 382/61 |
| 5,003,613 | 3/1991 | Lovelady et al. | 382/17 |
| 5,010,580 | 4/1991 | Vincent et al. | 382/17 |
| 5,014,329 | 5/1991 | Rudak | 382/17 |
| 5,140,650 | 8/1992 | Casey et al. | 382/61 |
| 5,216,498 | 6/1993 | Matsunawa et al. | 382/17 |
| 5,235,653 | 8/1993 | Nakano et al. | 382/61 |
| 5,259,041 | 11/1993 | Kato et al. | 382/17 |

*Primary Examiner*—Jose L. Couso
*Attorney, Agent, or Firm*—Staas & Halsey

[57] ABSTRACT

An image processing apparatus includes a storing unit for storing a chromaticity measured in advance with respect to a blank printed in a dropout color on a sheet, or with respect to a visual information filled in the blank, and a unit for judging coincidence or non-coincidence of the chromaticity stored in the storing unit with each chromaticity of respective picture elements constituting an image information obtained by reading the sheet. Where the storing unit stores a chromaticity regarding the blank, the image processing apparatus further includes a unit for detecting an arrangement region of the blank on the sheet based on results of the judging, then extracting an image information corresponding to the arrangement region, and carrying out a dropout processing with respect to the extracted image information to thereby extract the visual information. Where the storing unit stores a chromaticity regarding the visual information, the image processing apparatus further includes a unit for extracting the visual information based on results of the judging. By the constitution, it is possible to relieve various restrictions regarding the sheet and the reading thereof, and to carry out the dropout processing with a high precision, while reducing a running cost and a management cost pertaining to the sheet. This contributes to an improvement in the degree of recognition of the image information in the pattern recognition.

6 Claims, 12 Drawing Sheets

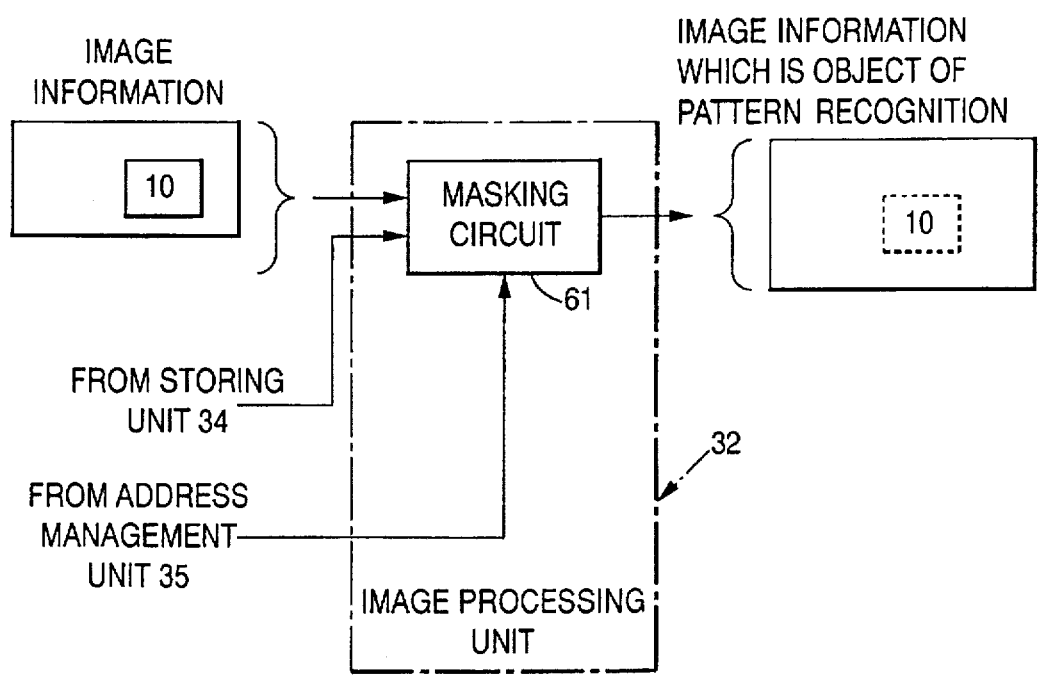
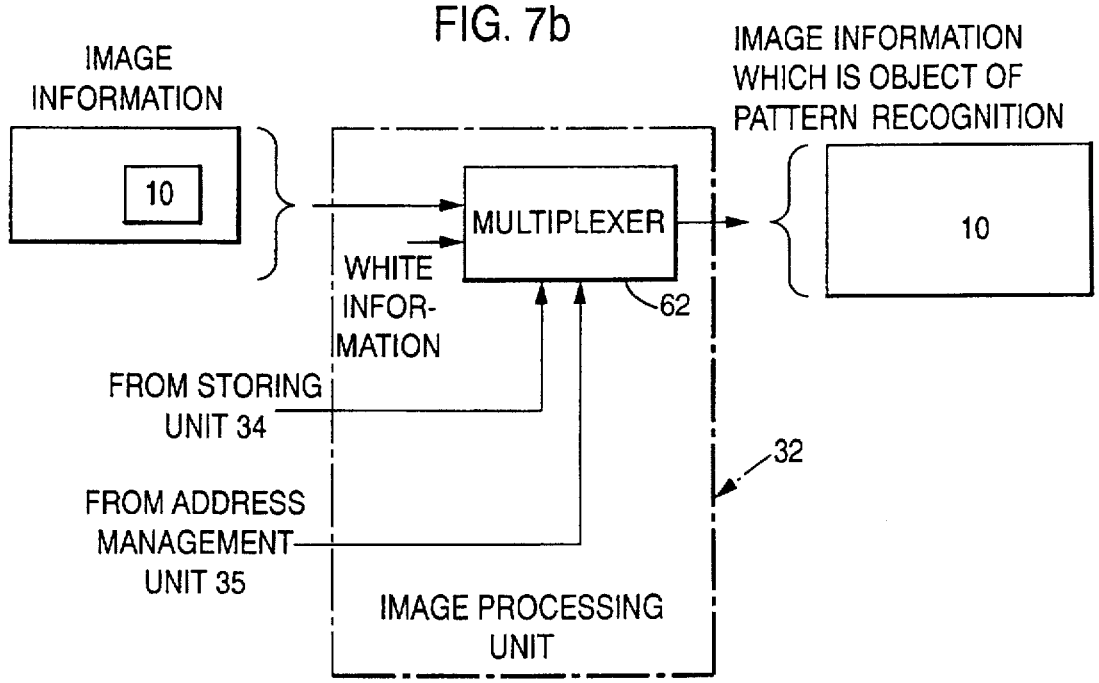

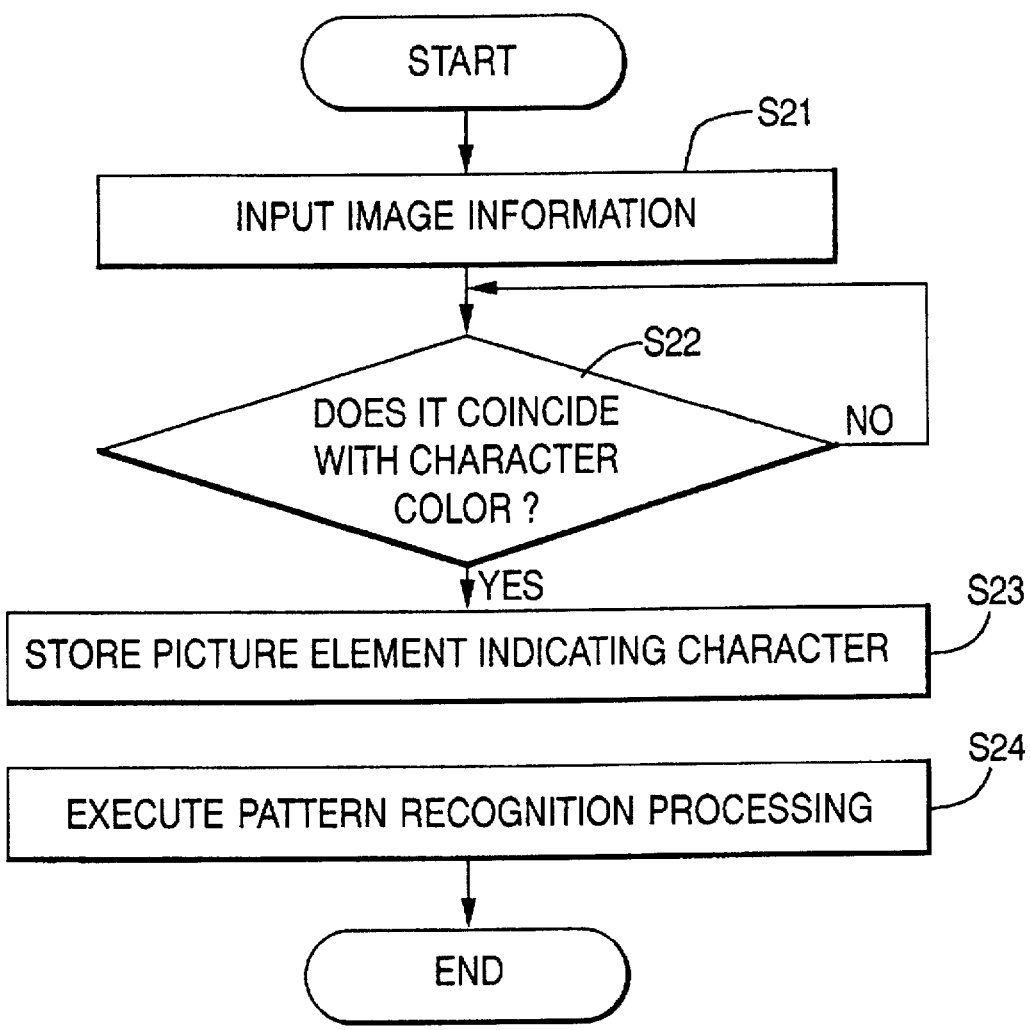

IMAGE PROCESSING APPARATUS WITH FUNCTION OF EXTRACTING VISUAL INFORMATION FROM REGION PRINTED IN DROPOUT COLOR ON SHEET

This application is a continuation of application Ser. No. 08/136,463, filed Oct. 15, 1993, now abandoned.

BACKGROUND OF THE INVENTION

1. Field of the Invention

The present invention relates to an image processing apparatus. More particularly, the present invention relates to a technique of extracting visual information (e.g., character information), from a region (blank) printed on a sheet in a dropout color that can be discriminated by man, but cannot be discriminated by an optical reading apparatus.

2. Description of the Related Art

For example, as shown in FIGS. 1a to 1c, character information to be read by an optical character reading apparatus (hereinafter referred to as an OCR) is generally filled in a frame region (blank) 3 in a dropout color which can be discriminated by man, but cannot be discriminated by the apparatus, on a sheet 1 (see FIGS. 1a, 1b). A read sensor in the OCR discriminates character information (in the illustrated example, "10000") filled in the sheet 1 from the frame region (blank) 3 based on the difference in color therebetween, carries out a so-called dropout processing for removing the frame region 3, and thus extracts image information including only character information (see FIG. 1c). Further, the extracted image information is subject to a pattern recognition processing.

Conventionally, in a known OCR, a region, which is an object of pattern recognition on a sheet in which character information to be read is filled, has been determined based on criterion of the regular direction and position in a reading of the sheet. Accordingly, where the sheet is read with being greatly inclined with respect to the regular read direction, or where the sheet is greatly displaced with respect to the regular position, a problem occurs in that a precision in extraction of character information or image information filled in a frame region is lowered, and thus the degree of recognition of the character information in the pattern recognition is lowered.

Also, regarding the above sheet, respective high precisions are demanded in a production of the sheet with respect to a shape and uniformity of a color of the sheet, and with respect to a shape, dropout color, and a position of a frame region to be printed. Also, in a storage of the sheet, it is required to pay attention to preventing the respective precisions from being deteriorated due to sunlight or other conditions. To this end, problems occur in that a running cost and a management cost pertaining to the sheet are increased, and in that it is impossible to flexibly cope with the variety of print colors and colors of character information to be filled.

Furthermore, where a reading of a sheet into which character information and image information such as photographs are incorporated, e.g., a reading of a catalog, is carried out, a problem occurs in that it is impossible to normally execute a dropout processing. This is because information with the same color as that of the character information, or with the same color as the dropout color, is included in the image information. As a result, a disadvantage arises in that time required for the operation processing in the pattern recognition is prolonged, and thus the degree of recognition is lowered. Such a disadvantage can be removed, for example, by effecting a processing of masking unnecessary image information such as photographs, prior to the pattern recognition processing. However, since such a masking processing is realized using a complicated operation processing, it cannot always apply to an ordinary work using an OCR, in view of restrictions of the response and cost.

SUMMARY OF THE INVENTION

An object of the present invention is to provide an image processing apparatus which can (a) relieve various restrictions regarding a sheet and a reading thereof, and (b) carry out a dropout processing with high precision while reducing a running cost and a management cost pertaining to the sheet, thereby contributing to an improvement in the degree of recognition of image information in a pattern recognition.

To attain the above object, according to a first aspect of the present invention, there is provided an image processing apparatus which extracts a visual information filled in a blank printed in a dropout color on a sheet. The image processing apparatus includes: a storing means for storing a chromaticity measured in advance with respect to the blank; a blank detecting means for judging coincidence or non-coincidence of the chromaticity stored in the storing means with each chromaticity of respective picture elements constituting an image information obtained by reading the sheet, and based on results of the judging, detecting an arrangement region of the blank on the sheet; and an image processing means for extracting an image information corresponding to the arrangement region of the blank detected by the blank detecting means, from the image information obtained by reading the sheet, and for carrying out a dropout processing with respect to the extracted image information to thereby extract the visual information.

Also, according to a second aspect of the present invention, there is provided an image processing apparatus which extracts a visual information filled in a blank printed in a dropout color on a sheet. The image processing apparatus includes: a storing means for storing a chromaticity measured in advance with respect to the visual information; and an image processing means for judging coincidence or non-coincidence of the chromaticity stored in the storing means with each chromaticity of respective picture elements constituting an image information obtained by reading the sheet, and based on results of the judging, extracting the visual information.

BRIEF DESCRIPTION OF THE DRAWINGS

Other objects and features of the present invention will be described hereinafter in detail by way of preferred embodiments with reference to the accompanying drawings, in which:

FIGS. 7a and 7b are explanatory diagrams of the masking processing;

FIG. 12 is a flowchart representing the processing executed by the apparatus of the embodiment of FIG. 11;

FIGS. 13a and 13b are diagrams showing applications of the image information extraction according to the present invention, respectively.

DESCRIPTION OF THE PREFERRED EMBODIMENTS

Throughout the description, identical references used in connection with the drawings indicate like constituent elements, and thus the repetition of explanation thereof is omitted.

Figure 1A:
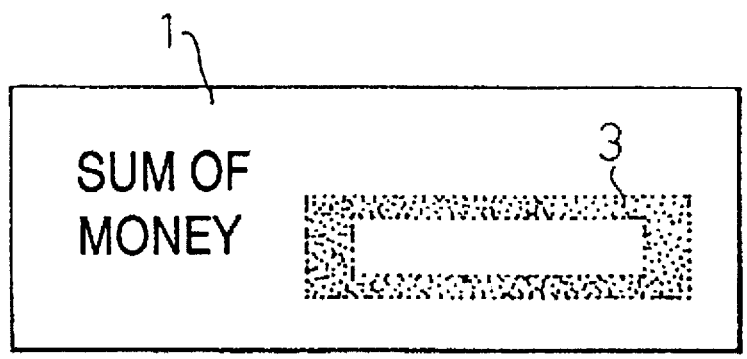
FIGS. 1a to 1c are explanatory diagrams of an extraction of image information.
Figure 1B:
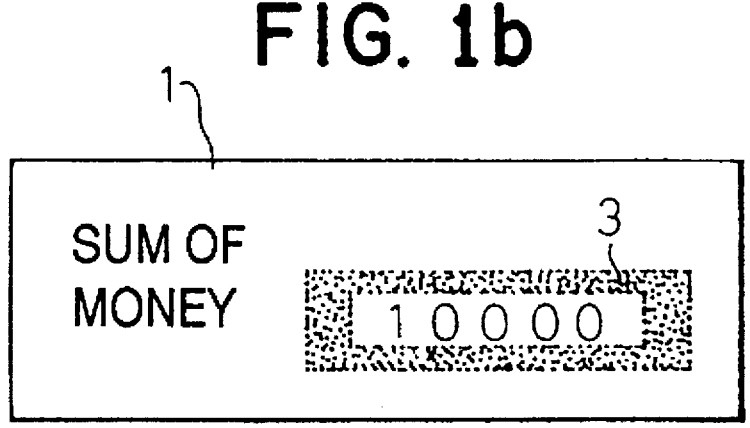
Figure 1C:
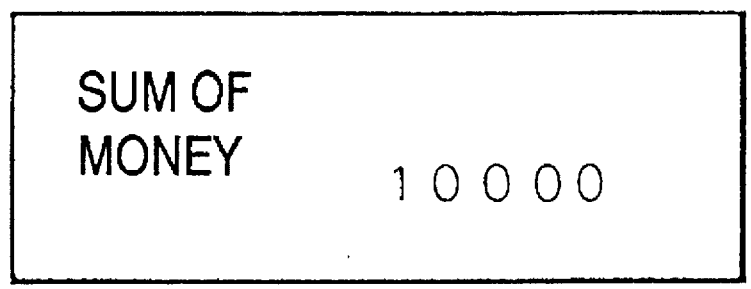
Figure 2:
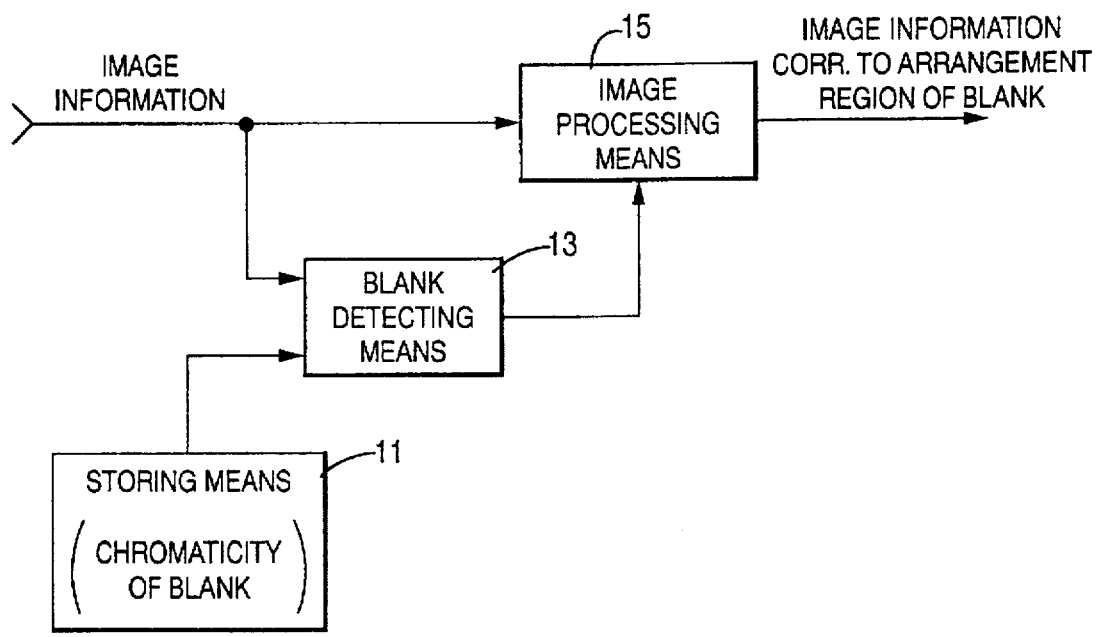
FIG. 2 is a block diagram illustrating the fundamental constitution of the image processing apparatus according to a first aspect of the present invention.

FIG. 2 illustrates the fundamental constitution of the image processing apparatus according to a first aspect of the present invention.

The illustrated constitution shows an image processing apparatus with a function of extracting a visual information filled in a blank printed in a dropout color on a sheet, from the blank. The image processing apparatus includes a storing means 11 for storing a chromaticity measured in advance with respect to the blank; a blank detecting means 13 for judging coincidence or non-coincidence of the chromaticity stored in the storing means 11 with each chromaticity of respective picture elements constituting an image information obtained by reading the sheet, and based on results of the judging, detecting an arrangement region of the blank on the sheet; and an image processing means 15 for extracting an image information corresponding to the arrangement region of the blank detected by the blank detecting means 13, from the image information obtained by reading the sheet, and for carrying out a dropout processing with respect to the extracted image information to thereby extract the visual information.

Figure 3:
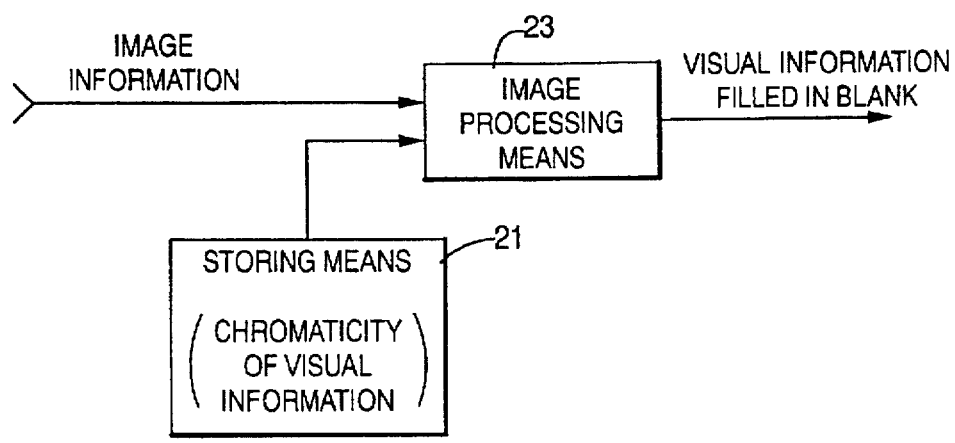
FIG. 3 is a block diagram illustrating the fundamental constitution of the image processing apparatus according to a second aspect of the present invention.

Also, FIG. 3 illustrates the fundamental constitution of the image processing apparatus according to a second aspect of the present invention.

The illustrated constitution shows an image processing apparatus with a function of extracting a visual information filled in a blank printed in a dropout color on a sheet, from the blank. The image processing apparatus includes a storing means 21 for storing a chromaticity measured in advance with respect to the visual information; and an image processing means 23 for judging coincidence or non-coincidence of the chromaticity stored in the storing means 21 with each chromaticity of respective picture elements constituting an image information obtained by reading the sheet, and based on results of the judging, extracting the visual information.

According to the constitution shown in FIG. 2, the storing means 11 stores the chromaticity measured in advance with respect to the blank on the sheet in which the visual information to be read is filled. The blank detecting means 13 judges coincidence or non-coincidence of the chromaticity stored in the storing means 11 with each chromaticity of respective picture elements constituting an image information obtained by actually reading the sheet, and based on results of the judgement, detects an arrangement region of the blank in which the visual information is filled, on the sheet.

The arrangement region thus detected precisely indicates a position of the blank on the sheet, even if there is any displacement, offset, or non-uniformity in the direction or position of the read sheet, or in the chromaticity or shape of the blank. Accordingly, the image processing means 15 extracts an image information corresponding to the arrangement region of the blank detected by the blank detecting means 13, from the above image information (i.e., image information obtained by reading the sheet), carries out a dropout processing with respect to the extracted image information, and thus assuredly extracts the visual information.

On the other hand, according to the constitution shown in FIG. 3, the storing means 21 stores the chromaticity of the visual information measured in advance from the sheet in which the visual information to be read is filled. The image processing means 23 judges coincidence or non-coincidence of the chromaticity stored in the storing means 21 with each chromaticity of respective picture elements constituting an image information obtained by actually reading the sheet.

Results of the judgement can be precisely obtained even if there is any displacement, offset, or non-uniformity in the direction or position of the read sheet, or in the chromaticity or shape of the blank. Accordingly, as long as the image processing means 23 can detect the difference between the chromaticity of the blank and the chromaticity of the visual information filled in the blank, it can assuredly extract the visual information.

Next, preferred embodiments of the present invention will be explained with reference to FIGS. 4 to 14b. Note, in the description below, the case where the present invention is applied to an OCR is explained.

Figure 4:
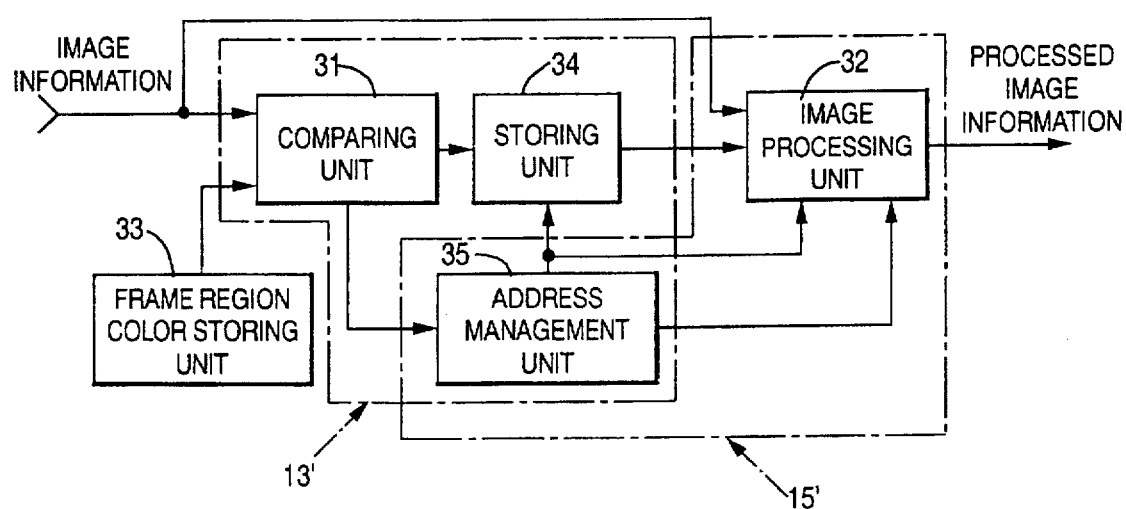
FIG. 4 is a block diagram illustrating the constitution of an embodiment according to the first aspect of the present invention.

FIG. 4 illustrates the constitution of an embodiment according to the first aspect of the present invention (see FIG. 2).

In the illustration, image information fed from a read sensor (not shown) is input to one input end of a comparing unit 31 and to a first input end of an image processing unit 32. Processed image information is obtained at an output end of the image processing unit 32. An output end of a frame region color storing unit 33 is connected to another input end of the comparing unit 31, and an output end of the comparing unit 31 is connected via a storing unit 34 to a second input end of the image processing unit 32. A control output end of the comparing unit 31 is connected to an input end of an address management unit 35, and an address output end of the address management unit 35 is connected to an address input end of the storing unit 34 and to a third input end of the image processing unit 32. A control output end of the address management unit 35 is connected to a fourth input end of the image processing unit 32.

Note, the comparing unit 31, the storing unit 34 and the address management unit 35 constitute a frame region detecting means 13', which corresponds to the blank detecting means 13 shown in FIG. 2. Also, the image processing unit 32 and the address management unit 35 constitute an image processing means 15', which corresponds to the image processing means 15 shown in FIG. 2. Also, the frame region color storing unit 33 corresponds to the storing means 11 shown in FIG. 2.

Figure 5:
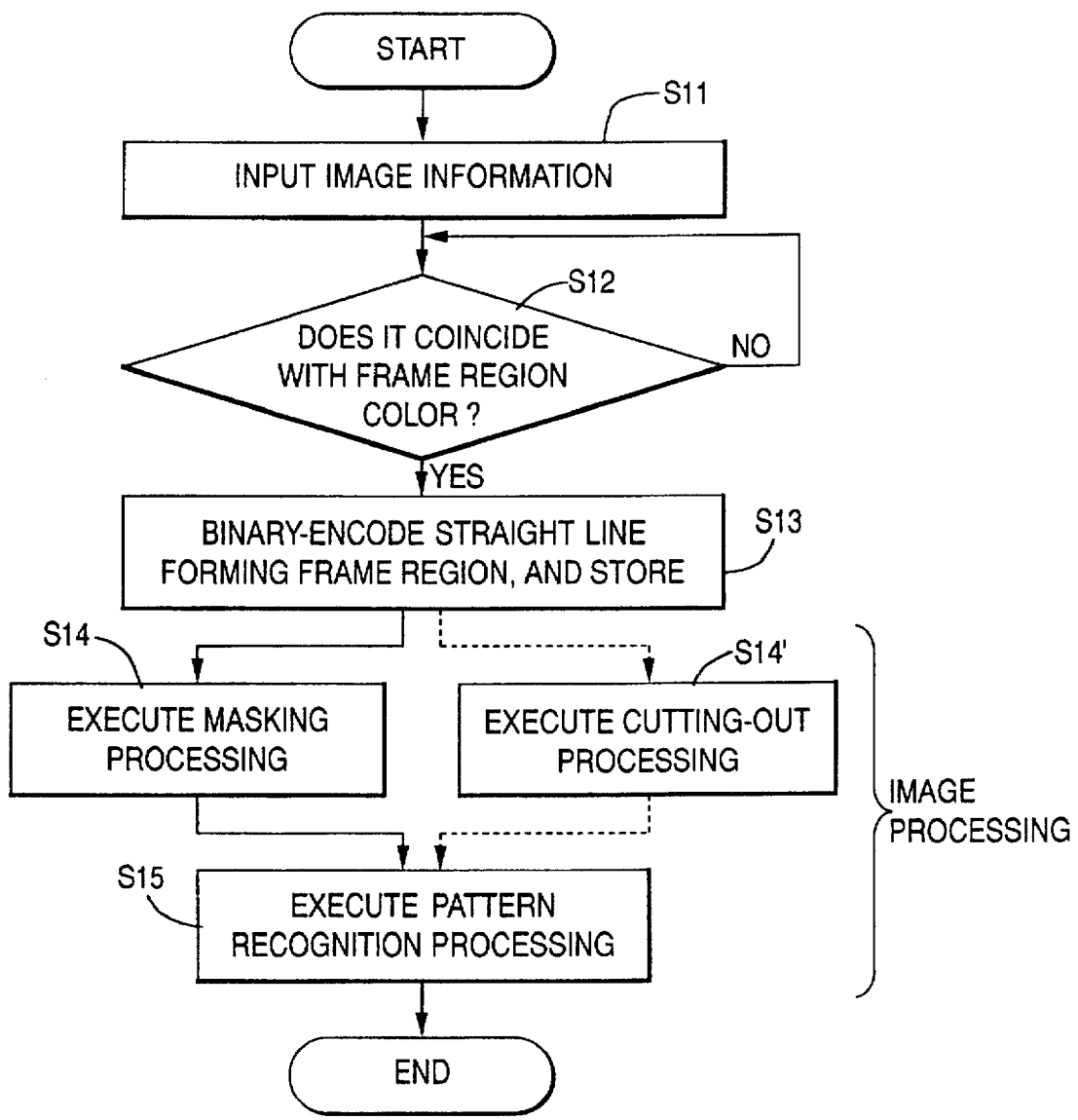
FIG. 5 is a flowchart representing the processing executed by the apparatus of the embodiment of FIG. 4.

Next, the processing executed by the apparatus of the present embodiment will be explained with reference to the flowchart shown in FIG. 5.

First, a frame region indicates a blank on a sheet in which character information (visual information) is filled. The character information will later be read. A color (dropout color) of the frame region is measured by a color meter in advance, and the measured color information is stored in the frame region color storing unit 33. When the sheet is set and read by the OCR, a read sensor in the OCR outputs image information representing individual picture elements, based on the RGB system of color representation, according to the sequence of the read scanning.

Figure 6:
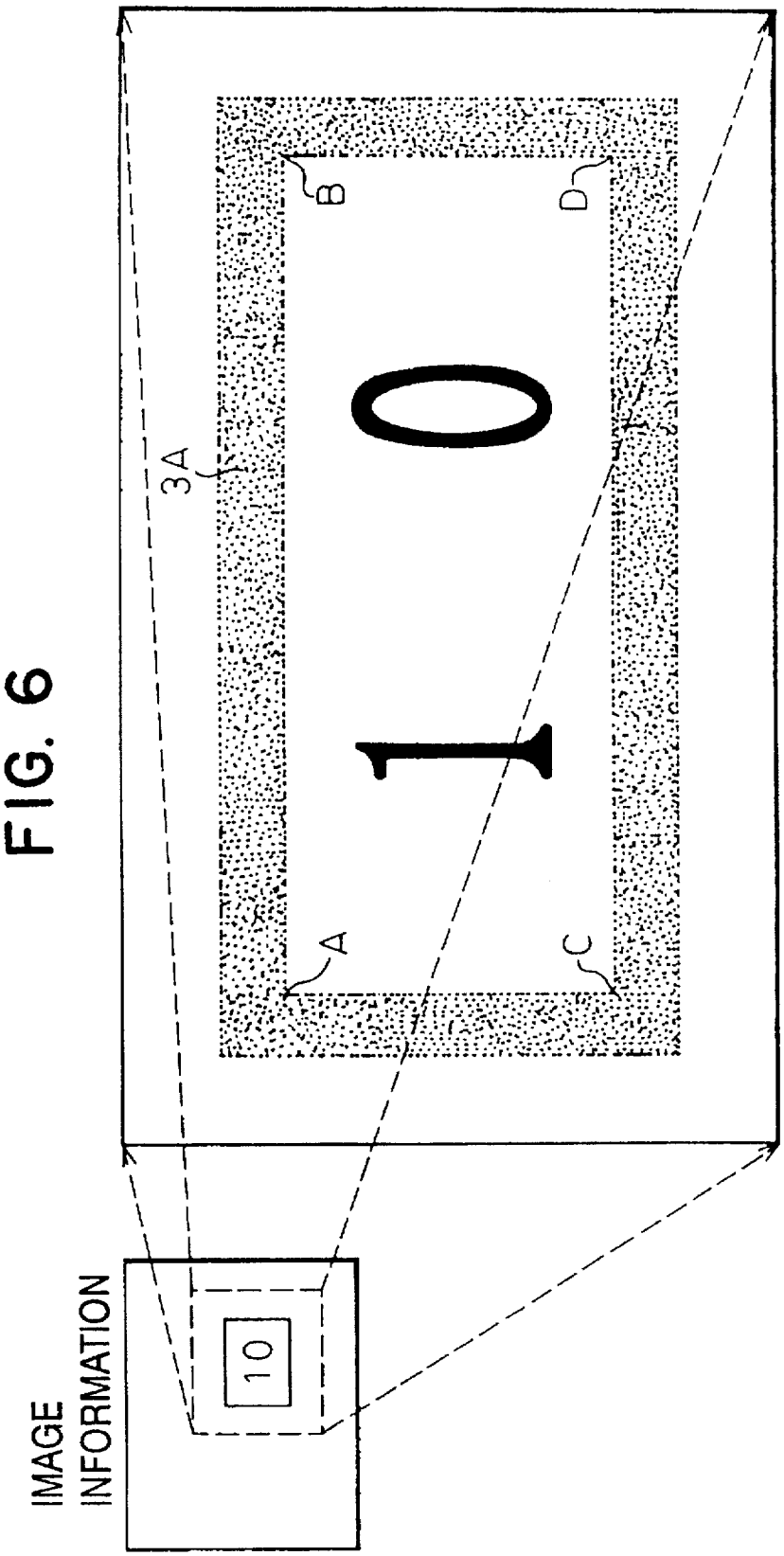
FIG. 6 is an explanatory diagram of detection of the frame region.

The output image information is sequentially input to the comparing unit 31 and the image processing unit 32 (step S11). The comparing unit 31 judges whether or not each chromaticity of respective picture elements constituting the input image information coincides with the dropout color stored in the frame region color storing unit 33 (step S12). Results of the judgement are stored in the storing unit 34 according to the above sequence of the read scanning. Accordingly, where the above scanning system is a raster scan system and the shape of the frame region is rectangular as shown in FIG. 6 by half-tone dot meshing, binary-encoded information on straight lines forming the frame region is stored in the storing unit 34 according to the above sequence of the scanning (step S13). When the store processing is repeated and thus all of information to be stored in the storing unit 34 are retained in the storing unit 34, the comparing unit 31 informs the address management unit 35 of the completion of the store processing.

The address management unit 35 in turn sends out a start command for image processing to the fourth input end of the image processing unit 32, and sends out addresses indicating individual picture elements which are objects of the image processing, according to a predetermined sequence, to the storing unit 34 and the third input end of the image processing unit 32.

The storing unit 34 sequentially reads and outputs information corresponding to the addresses fed from the address management unit 35, from the above binary-encoded information.

The image processing unit 32 extracts an image information corresponding to the frame region from the binary information sequentially output from the storing unit 34, and executes a dropout processing with respect to the extracted image information. Concretely, the dropout processing is realized by a masking processing using a masking circuit 61 shown in FIG. 7a or a multiplexer 62 shown in FIG. 7b. Namely, where the binary information output from the storing unit 34 indicates a region of the straight lines forming the frame region, the masking circuit 61 or multiplexer 62 executes a masking processing of transducing the information of picture elements corresponding to addresses of the frame region into "white" information (step S14). On the other hand, where the binary information output from the storing unit 34 indicates a region other than the frame region, the masking circuit 61 or multiplexer 62 does not execute a masking processing, and outputs the binary information as a processed image information.

Figure 8:
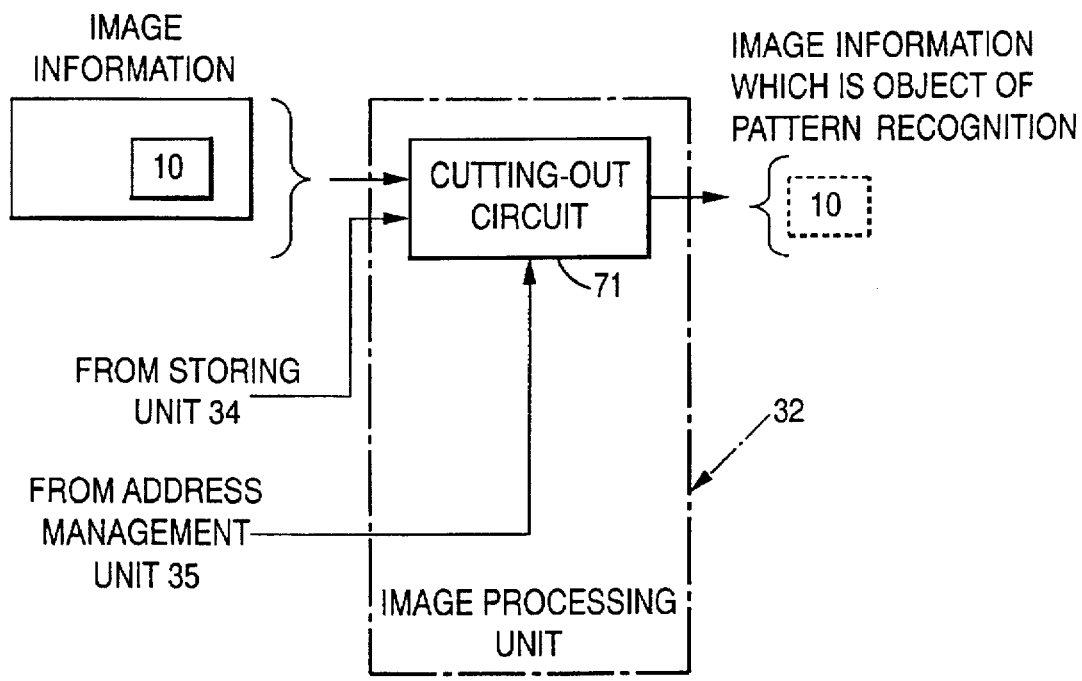
FIG. 8 is an explanatory diagram of the cutting-out processing.

As means for realizing the dropout processing, the above masking processing (step S14) may be replaced by a cutting-out processing (step S14'), e.g., using a cutting-out circuit 71 as shown in FIG. 8. In this case, in the process of step S13, coordinates of picture elements corresponding to four corners A to D indicating the inside boundary of the frame region 3A shown in FIG. 6 are determined and stored in the storing unit 34. Then, the cutting-out circuit 71 in the image processing unit 32 extracts only an image information corresponding to a region inside the frame region obtained by linking the coordinates A to D, from the image information which has been already stored in the image processing unit 32.

Figure 9A:
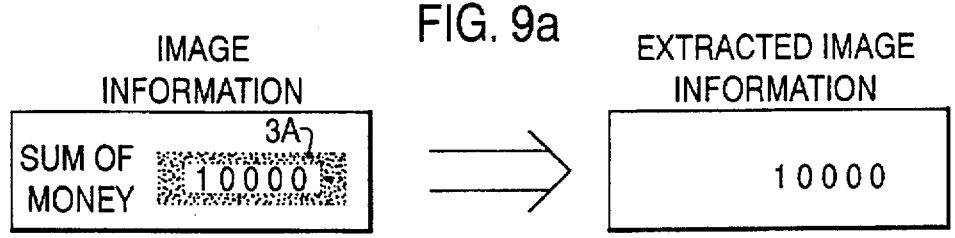
FIGS. 9a and 9b are diagrams showing results of the extraction of image information based on the masking processing and the cutting-out processing, respectively.
Figure 9B:
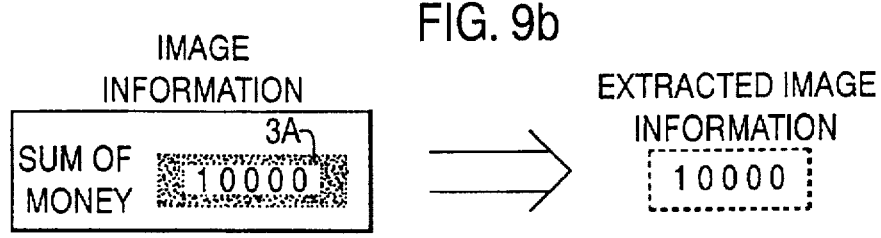

Thus, as shown in FIGS. 9a and 9b, the dropout processing for the frame region 3A is executed with a high precision based on the actual color, shape and arrangement position thereof, even (1) if there is any non-uniformity in the shape or color of the sheet, (2) where the sheet is read with being greatly inclined with respect to the regular read direction, (3) where the sheet is greatly displaced with respect to the regular position, or (4) if there is any non-uniformity in the shape, dropout color, or arrangement position of the frame region 3A.

Therefore, image information on characters filled inside the frame region 3A can be stably and assuredly extracted. The extracted character information is correlated, for example, using a correlation circuit 81 shown in FIG. 10, with reference character patterns (comparison character patterns) prepared in advance. As a result, it is possible to obtain a character code corresponding to the maximum correlation value (see FIG. 5, PATTERN RECOGNITION PROCESSING at step S15). Thus, it is possible to heighten the degree of recognition of the image information in the pattern recognition.

Figure 11:
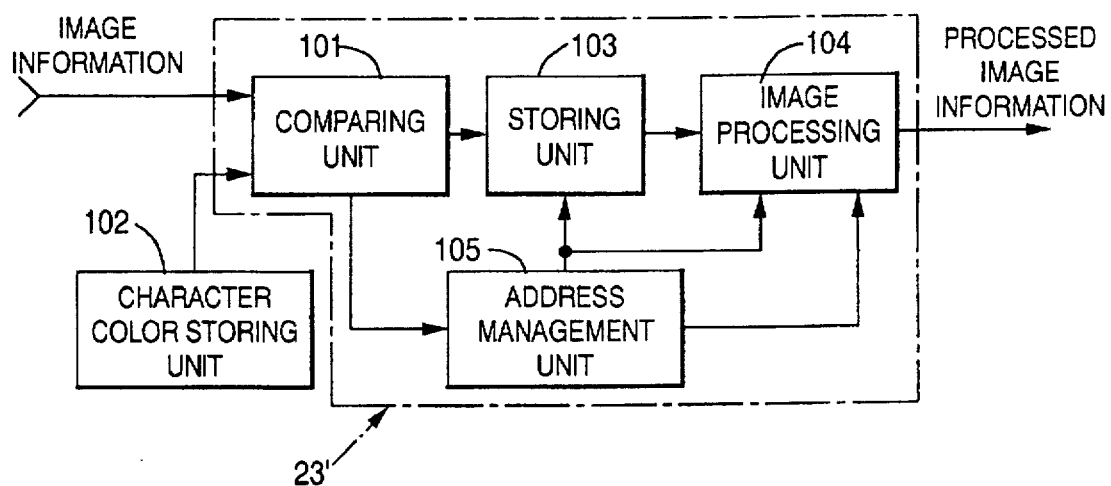
FIG. 11 is a block diagram illustrating the constitution of an embodiment according to the second aspect of the present invention.

FIG. 11 illustrates the constitution of an embodiment according to the second aspect of the present invention (see FIG. 3).

In the illustration, image information fed from a read sensor (not shown) is input to one input end of a comparing unit 101, and an output end of a character color storing unit 102 is connected to another input end of the comparing unit 101. An output end of the comparing unit 101 is connected via a storing unit 103 to a first input end of an image processing unit 104. Processed image information is obtained at an output end of the image processing unit 104. A control output end of the comparing unit 101 is connected to an input end of an address management unit 105, and an address output end of the address management unit 105 is connected to an address input end of the storing unit 103 and to a second input end of the image processing unit 104. A control output end of the address management unit 105 is connected to a third input end of the image processing unit 104.

Note, the comparing unit 101, the storing unit 103, the image processing unit 104 and the address management unit 105 constitute an image processing means 23', which corresponds to the image processing means 23 shown in FIG. 3. Also, the character color storing unit 102 corresponds to the storing means 21 shown in FIG. 3.

Next, the processing executed by the apparatus of the present embodiment will be explained with reference to the flowchart shown in FIG. 12.

First, a color of character information filled in a frame region (i.e., blank) printed in a dropout color on a sheet (note, a color different from the dropout color) is measured by a color meter in advance, and the measured color information is stored in the character color storing unit 102. When the sheet is set and read by the OCR, a read sensor in the OCR outputs image information representing individual picture elements, based on the RGB system of color representation, according to the sequence of the read scanning.

The output image information is sequentially input to the comparing unit 101 (step S21). The comparing unit 101 judges whether or not each chromaticity of respective picture elements constituting the input image information coincides with the color information stored in the character color storing unit 102 (step S22). Results of the judgement are stored in the storing unit 103 according to the above sequence of the read scanning. Accordingly, where the above scanning system is a raster scan system and the shape of the frame region is rectangular as shown in FIG. 6 by half-tone dot meshing, binary-encoded information on picture elements indicating characters filled inside the frame region is stored in the storing unit 103 according to the above sequence of the scanning (step S23). When the store processing is repeated and thus all of information to be stored in the storing unit 103 are retained in the unit 103, the comparing unit 101 informs the address management unit 105 of the completion of the store processing.

The address management unit 105 in turn sends out a start command for image processing to the third input end of the image processing unit 104, and sends out addresses indicating individual picture elements which are objects of the image processing, according to a predetermined sequence, to the storing unit 103 and the second input end of the image processing unit 104.

The storing unit 103 sequentially reads and outputs information corresponding to the addresses fed from the address management unit 105, from the above binary-encoded information.

The image processing unit 104 extracts information on characters filled inside the frame region (i.e., image information), from the binary information sequentially output from the storing unit 103.

Thus, the image information on characters filled in the predetermined color on the sheet is extracted with a high precision based on the difference between the actual color of the characters and the dropout color of the frame region, even if there is any non-uniformity in the shape or color of the sheet, or even where the sheet is read with being greatly inclined with respect to the regular read direction, or where the sheet is greatly displaced with respect to the regular position, or even if there is any non-uniformity in the shape, dropout color, or arrangement position of the frame region.

Figure 10:
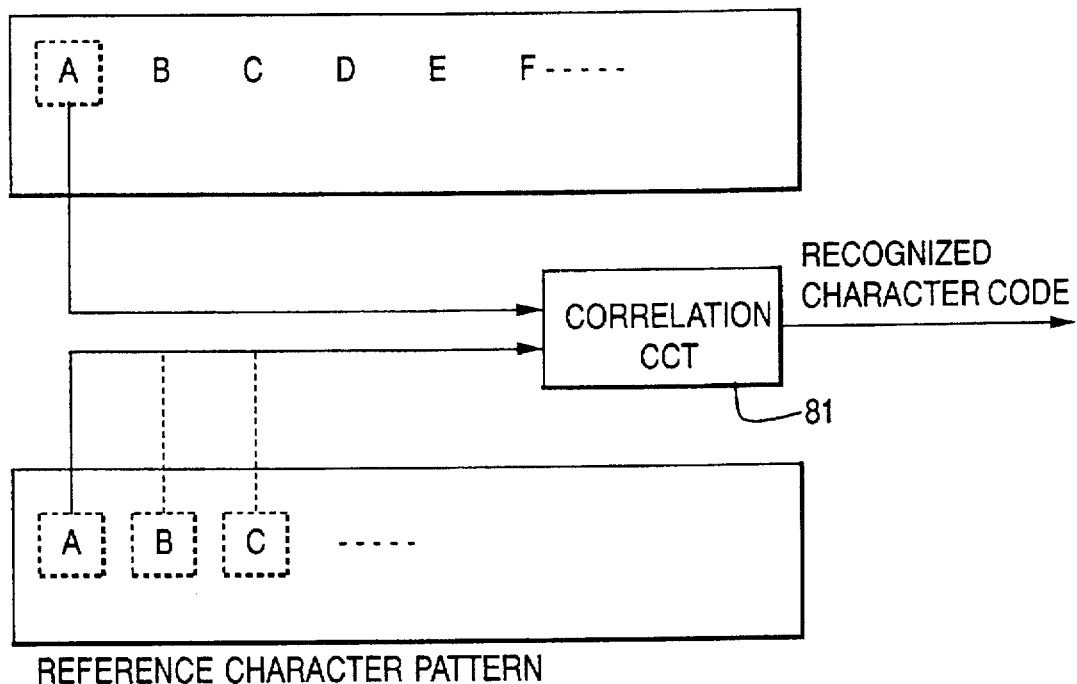
FIG. 10 is an explanatory diagram of character recognition.

Therefore, the image processing unit 104 can execute a processing of the pattern recognition shown in FIG. 10, with respect to the extracted image information (see FIG. 12, PATTERN RECOGNITION PROCESSING at step S24).

Figure 13A:
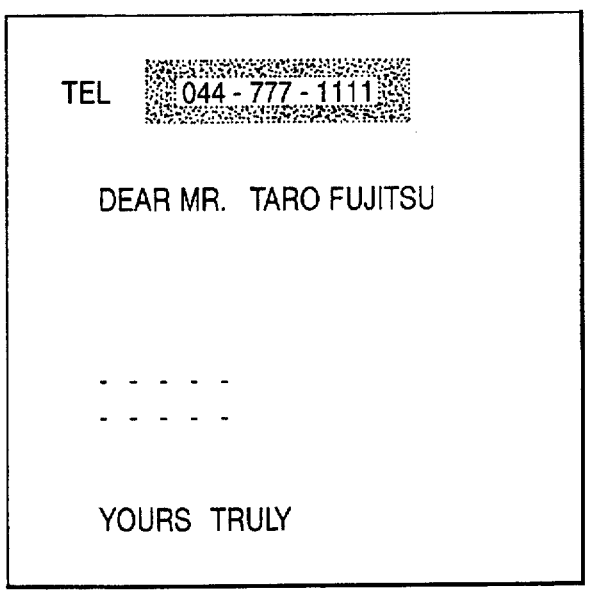
Figure 13A:
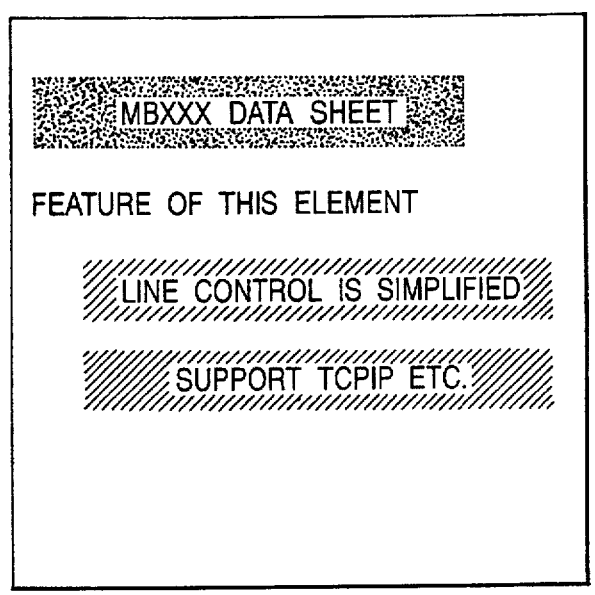
Figure 14A:
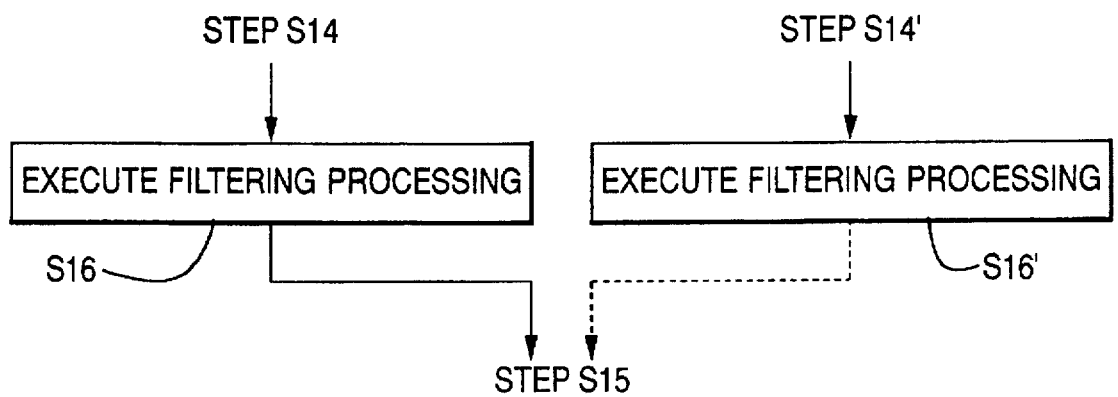
FIGS. 14a and 14b are flowcharts representing the processings for realizing the examples shown in FIGS. 13a and 13b.
Figure 14B:
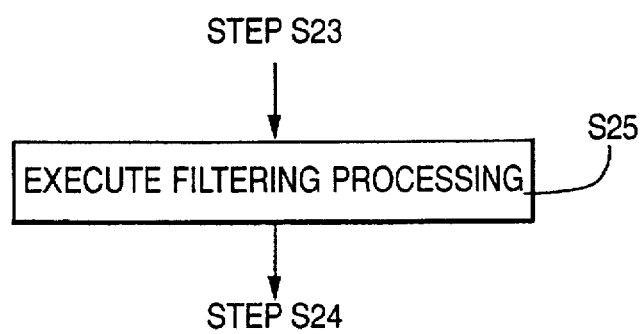

Although, in the above embodiments, character information which is an object of the pattern recognition is filled inside a frame region (blank) printed in a dropout color, the present invention is not restrictive to such a blank. For example, where the whole blank is printed in a dropout color, or where the blank is printed by half-tone dot meshing as shown in FIGS. 13a and 13b, it is possible to embody the invention by executing a filtering processing as shown in FIGS. 14a and 14b (step S16 or S16', step S25). The filtering processing is carried out prior to the pattern recognition processing (corresponding to step S15 of FIG. 5, or step S24 of FIG. 12), and is intended to remove dropout color components contained in a region common to the portion of character information.

Also, although, in the above embodiments, only character information which is an object of the pattern recognition is filled in the blank, the present invention is not restrictive to such character information. The important thing is that the present invention is applicable to any visual information including characters, graphics, or the like, so long as the visual information is filled in a color different from the dropout color indicating the blank.

Furthermore, although, in the above embodiments, the dropout processing is carried out with respect to an image information representing respective picture elements, according to the read scanning of the sheet, in the form of the RGB System of color representation, the present invention is not restrictive to such an image information. The present invention is applicable to any image information, regardless of the kind of a system of color representation to be used, or the system of a read scanning.

Also, although, in the above embodiments, the shape of the frame region or blank printed in advance on a sheet is rectangular, the present invention is not restrictive to the rectangular shape. The important thing is that the present invention is applicable to any shape, so long as the difference between a dropout color indicating the frame region or blank and a color of visual information to be read can be detected by a read sensor.

Furthermore, the present invention is not restrictive to an OCR. For example, as shown by half-tone dot meshing in FIG. 13a, the present invention is applicable to a facsimile terminal equipment which uses a transmission form with a blank printed in advance in a dropout color different from a color of information on a telephone number of destination; reads the telephone number filled in the blank to thereby effect a pattern recognition; and then automatically transmits the transmission form. Also, as shown by two kinds of half-tone dot meshing in FIG. 13b, the present invention is applicable to a document filing system which uses an input form with two kinds of blanks printed in advance in different dropout colors (e.g., red color and blue color), each blank indicating a key word and a subkey word used as references of document retrieval, respectively; reads the key word and the subkey word written in the respective blanks, together with character information filled in the input form, to thereby effect a pattern recognition; and then automatically makes a database.

As explained above, according to the present invention, a correlation is made between the chromaticity measured in advance with respect to the region (blank) printed in a dropout color on a sheet, or with respect to the visual information filled in the blank, and each chromaticity of respective picture elements contained in an image information obtained by actually reading the sheet. Accordingly, even if there is any non-uniformity in the read direction or position of the sheet, or in the chromaticity or shape of the blank, it is possible to precisely detect an actual arrangement position of the blank on the sheet, and to directly extract the visual information.

Also, regarding sheets which are produced with blanks printed in advance, it is possible to expand respective permissible errors in the shape and size of each sheet, and in the color and shape of each blank, compared with the prior art in which the color of a blank subject to a dropout processing has been fixedly selected. This contributes to a reduction in cost of the sheets and to a simplification in storage thereof.

Therefore, in an image processing apparatus processing visual information including characters, and the like, using the present invention, it is possible to heighten a precision of the processing and to reduce a running cost.

Although the present invention has been disclosed and described by way of two embodiments, it is apparent to those skilled in the art that other embodiments and modifications of the present invention are possible without departing from the spirit or essential features thereof.

We claim:

1. An image processing apparatus which extracts visual information filled in a blank printed in a dropout color on a sheet, substantially the entire blank being printed in the dropout color, the image processing apparatus comprising storing means for storing a color measured in advance with respect to the blank;

blank detecting means for scanning the sheet to obtain image information from the sheet, for judging coincidence or non-coincidence of the color stored in the storing means with the color of respective picture elements forming the image information and, based on results of the judging, for detecting an arrangement region of the blank on the sheet; and image processing means for extracting image information corresponding to the arrangement region of the blank detected by the blank detecting means, from the image information obtained by scanning the sheet, and for performing dropout processing with respect to the extracted image information to thereby extract the visual information, the image processing means including means for filter processing to remove dropout color components in a region common to the visual information and the blank.

2. The image processing apparatus as set forth in claim 1, wherein the blank detecting means comprises:

a comparing unit for judging whether or not the color of respective picture elements forming the image information obtained by scanning the sheet coincides with the color stored in the storing means, the comparing unit producing a control signal indicating that judging is complete;

a storing unit for storing results of the judging of the comparing unit, in the form of binary information according to the sequence of the scanning of the sheet; and an address management unit, responsive to the control signal, for sending a start command for image processing to the image processing means and for sending addresses indicating individual picture elements which are an object of the image processing, to the storing unit and the image processing means according to a predetermined sequence, wherein the storing unit reads and outputs, in sequence, binary image information corresponding to the addresses fed from the address management unit.

3. The image processing apparatus as set forth in claim 2, wherein the image processing means comprises a circuit which performs masking processing for transducing the image information corresponding to the arrangement region of the blank, among the binary image information output from the storing unit, into white color information.

4. The image processing apparatus as set forth in claim 2, wherein the image processing means comprises a circuit which performs cutting-out processing for extracting the visual information based on the image information corresponding to the arrangement region of the blank, among the binary image information output from the storing unit.

5. An image processing apparatus which extracts visual information filled in a blank printed in a dropout color on a sheet, substantially the entire blank being printed in the dropout color, the image processing apparatus comprising:

storing means for storing a color measured in advance with respect to the visual information; and image processing means for scanning the sheet to obtain image information from the sheet, for judging coincidence or non-coincidence of the color stored in the storing means with the color of respective picture elements forming the image information and, based on results of the judging, for extracting the visual information, the image processing means including means for filter processing to remove dropout color components in a region common to the visual information and the blank.

6. The image processing apparatus as set forth in claim 5, wherein the image processing means comprises:

a comparing unit for judging whether or not the color of respective picture elements forming the image information obtained by scanning the sheet coincides with the color stored in the storing means, the comparing unit producing a control signal indicating that judging is complete;

a storing unit for storing results of the judging of the comparing unit, in the form of binary information according to the sequence of the scanning of the sheet;

an address management unit, responsive to a control signal, for sending out a start command for image processing, and for sending out addresses indicating individual picture elements which are an object of the image processing, according to a predetermined sequence; and an image processing unit for extracting the visual information based on binary information output in sequence from the storing unit, corresponding to the addresses fed from the address management unit.

* * * * *

UNITED STATES PATENT AND TRADEMARK OFFICE
CERTIFICATE OF CORRECTION

PATENT NO. : 5,664,031
DATED : Sept. 2, 1997
INVENTOR(S) : MURAI et al.

It is certified that error appears in the above-identified patent and that said Letters Patent is hereby corrected as shown below:

TITLE PAGE: [30] Foreign Application Priority Data, change "Nov." to --Oct.--.

Signed and Sealed this

Sixth Day of January, 1998

Attest:

BRUCE LEHMAN

Attesting Officer      *Commissioner of Patents and Trademarks*